US010602107B2

(12) United States Patent
Chiu et al.

(10) Patent No.: US 10,602,107 B2
(45) Date of Patent: Mar. 24, 2020

(54) PROJECTION DISPLAY APPARATUS AND DISPLAY METHOD

(71) Applicant: DELTA ELECTRONICS, INC., Taoyuan (TW)

(72) Inventors: Chui-Fan Chiu, Taoyuan (TW); Chung-Yi Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/361,255

(22) Filed: Mar. 22, 2019

(65) Prior Publication Data

US 2019/0297309 A1 Sep. 26, 2019

Related U.S. Application Data

(60) Provisional application No. 62/646,926, filed on Mar. 23, 2018.

(30) Foreign Application Priority Data

Dec. 4, 2018 (CN) .......................... 2018 1 1473542

(51) Int. Cl.
*H04N 9/31* (2006.01)
*H04N 7/01* (2006.01)
*H04N 5/21* (2006.01)

(52) U.S. Cl.
CPC .......... *H04N 9/3188* (2013.01); *H04N 9/312* (2013.01); *H04N 9/3105* (2013.01); *H04N 9/3182* (2013.01)

(58) Field of Classification Search
CPC ..... H04N 9/3105; H04N 9/312; H04N 9/3188

(Continued)

(56) References Cited

U.S. PATENT DOCUMENTS 6,456,340 B1 9/2002 Margulis
2003/0090597 A1* 5/2003 Katoh .................. H04N 9/3111
348/744

(Continued)

FOREIGN PATENT DOCUMENTS

CN 106603564 A 4/2017
TW 201215124 A 4/2012

OTHER PUBLICATIONS

The pertinent parts of US6456340B1.

*Primary Examiner* — Jefferey F Harold
*Assistant Examiner* — Jean W Desir
(74) *Attorney, Agent, or Firm* — CKC & Partners Co., LLC

(57) ABSTRACT

A projection display apparatus includes a motion deblurring circuit, an image processing circuit, a color managing circuit, an image projection display device and a multi-axis shifting device. The motion deblurring circuit receives an input video signal with the first resolution and processes it to reduce a motion blur. The image processing circuit receives the input video signal processed by the motion deblurring circuit, and converts it into a plurality of the output video signals with the second resolution. The color managing circuit receives the output video signals with the second resolution, separates the color of the output video signals, and outputs it. The projection device including a digital micro display component has a native resolution of a second resolution, and displays the output video signals. The multi-axis shifting device shifts the output video signals outputted from the image projection display device onto a projection screen with a control timing signal.

11 Claims, 6 Drawing Sheets

(58) Field of Classification Search
USPC .............. 348/745, 744, 806, 441, 581, 607; 382/299, 298
See application file for complete search history.

(56) References Cited

U.S. PATENT DOCUMENTS

| | | |
|---|---|---|
| 2016/0261823 A1 | 9/2016 | Sung et al. |
| 2018/0192013 A1 | 7/2018 | Kato et al. |
| 2019/0297308 A1* | 9/2019 | Yang .................... H04N 13/398 |

\* cited by examiner

PROJECTION DISPLAY APPARATUS AND DISPLAY METHOD

RELATED APPLICATIONS

This application claims priority to U.S. Provisional Application Ser. No. 62/646,926, filed Mar. 23, 2018, and China Application Serial Number 201811473542.5, filed Dec. 4, 2018, the disclosures of which are incorporated herein by reference in their entireties.

BACKGROUND

Field of Invention

The present of the disclosure relates to a projection display apparatus and display method. More particularly, the present disclosure relates to a projection display apparatus for displaying the 8K resolution images.

Description of Related Art

With the development of display technology, the need for the highest display resolution is becoming more common, for example, the need for the highest display resolution usually occurs in some large events or occasions where a large projection screen is required.

Many video signals have been developed to reach a resolution which is more than 4K (3840×2160), and even reach a resolution with 8K (7680×4320). The general projection display apparatus does not have a corresponding 8K projection display component. Therefore, a breakthrough in signal processing technology and display technology is needed so as to achieve 8K display technology.

SUMMARY

One aspect of the present disclosure is a projection display apparatus. The projection display apparatus includes a motion deblurring circuit, an image processing circuit, a color managing circuit, a projection device and a multi-axis shifting device. The motion deblurring circuit is configured to receive an input video signal with the first resolution and process the input video signal to reduce a motion blur generated by an object moving in a content of the input video signal. The image processing circuit is configured to receive the input video signal processed by the motion deblurring circuit and convert the input video signal processed by the motion deblurring circuit into a plurality of the output video signals with the second resolution. The image processing circuit is configured to receive the input video signal processed by the motion deblurring circuit and convert the input video signal into a plurality of the output video signals with the second resolution. The color managing circuit is configured to receive the output video signals with the second resolution, and separate the color of the output video signals and output the output video signals. The projection device including a digital micro display component is configured to display the output video signals. The multi-axis shifting device located in front of a projection lens is configured to periodically shift the projecting images outputted from the projection device onto a projection screen according to a control timing signal.

Another aspect of the present disclosure is a display method. The display method includes following operation: receiving a input video signal with a first resolution via a motion deblurring circuit, processing the input video signal to reduce a motion blur generated by an object moving in a content of the input video signal; receiving the input video signal processed by the motion deblurring circuit via a video processing circuit, converting the input video signal into a plurality of the output video signals with the second resolution; receiving the output video signals via a color managing circuit, separating the color of the output video signals, outputting the output video signals of different color components by a plurality of bus; transmitting the output video signals of different color components to a projection device via a plurality of formatters in a driving circuit; displaying the output video signals via the projection device; driving the projection device shifted via a multi-axis shifting device.

DETAILED DESCRIPTION

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the terms "coupled", "electrically coupled", "electrically connect" may indicate that two or more components being directly physically contacted or electrically contacted with each other, or indirectly physically contacted or electrically contacted with each other. That is, intervening elements may be present. Moreover, "electrically connect" or "connect" may further refer to the interoperation or interaction between two or more elements.

Figure 1:
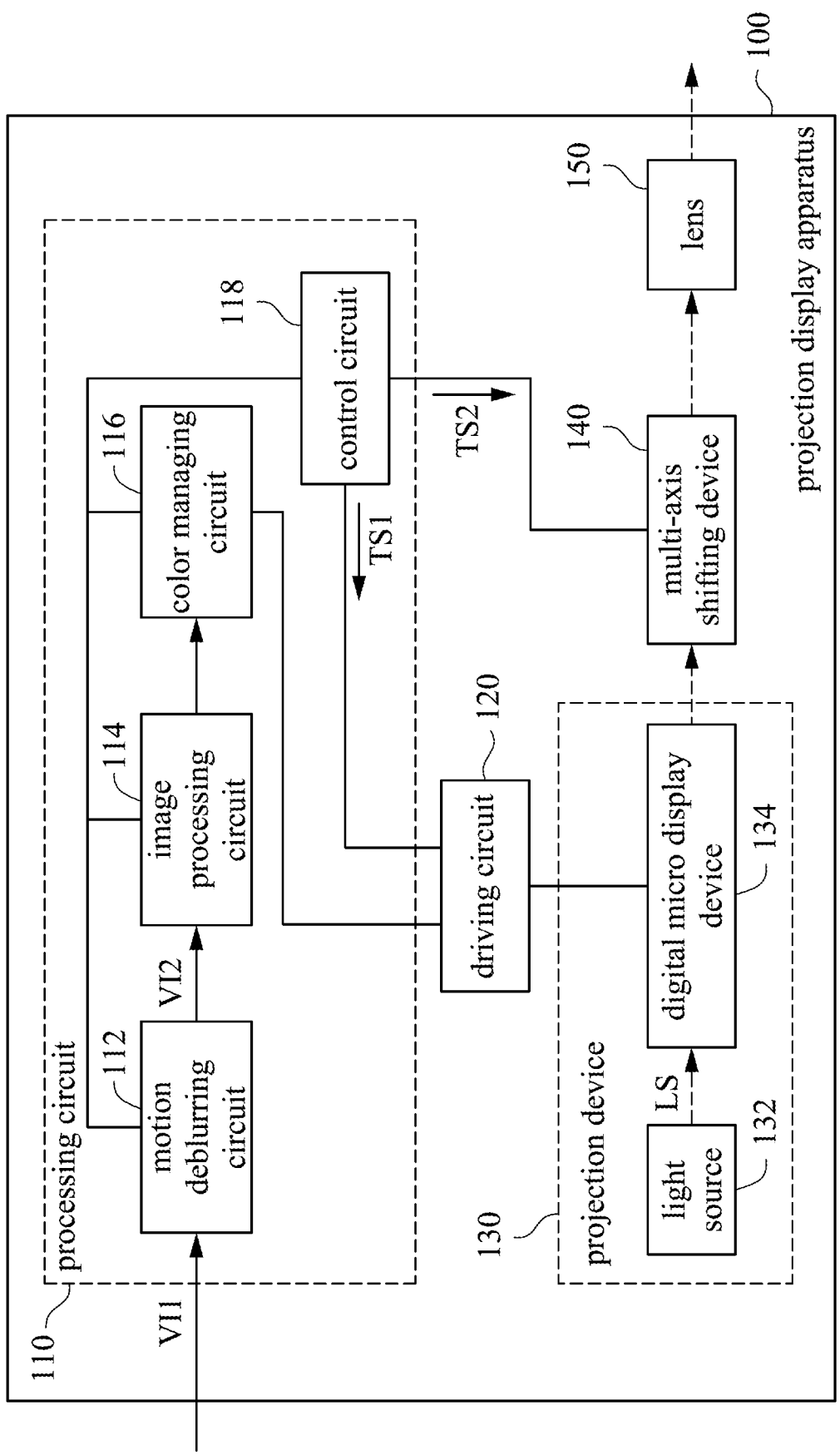
FIG. 1 is a function block diagram of a projection display apparatus according to an embodiment of the present disclosure.

Referring to FIG. 1, FIG. 1 is a function block diagram of a projection display apparatus according to an embodiment of the present disclosure. The projection display apparatus 100 includes a processing circuit 110, a driving circuit 120, a projection device 130, a multi-axis shifting device 140 and a lens 150. The processing circuit 110 includes a motion deblurring circuit 112, a image processing circuit 114, a color managing circuit 116 and a control circuit 118. The projection device 130 includes a light source 132 and a digital micro display component 134. The processing circuit 110 is electrically coupled to the driving circuit 120, the projection device 130 and the multi-axis shifting device 140.

In an embodiment, the processing circuit 110 may be a central processing unit (CPU), a graphics processor, a field programmable logic gate array (FPGA) or other circuit with image processing function.

It should be noted that, the projection display apparatus 100 is not limited to the above embodiments, and the connection relationship is also not limited to the above embodiments. Any connection method and implementation method sufficient for the projection display apparatus 100 to implement the following technical contents can be applied to the present disclosure.

In an embodiment, the projection device 130 in the projection display apparatus 100 has native 3840×2160 resolution, also known as 4K resolution. In some situations, the resolution of the input video signal VI1 may be greater than the native resolution of the projection device 130. For example, the input video signal VI1 has 7680×4320 resolution, also known as 8K resolution. In general, when the input image resolution is greater than the native resolution of the projection device, the projection display device can only exhibit the effect of native resolution. In an embodiment of the present disclosure, the projection display apparatus 100 can activate the multi-axis shifting device 140 according to the resolution of the input video signal VI1. The detailed process will be described later.

Figure 2:
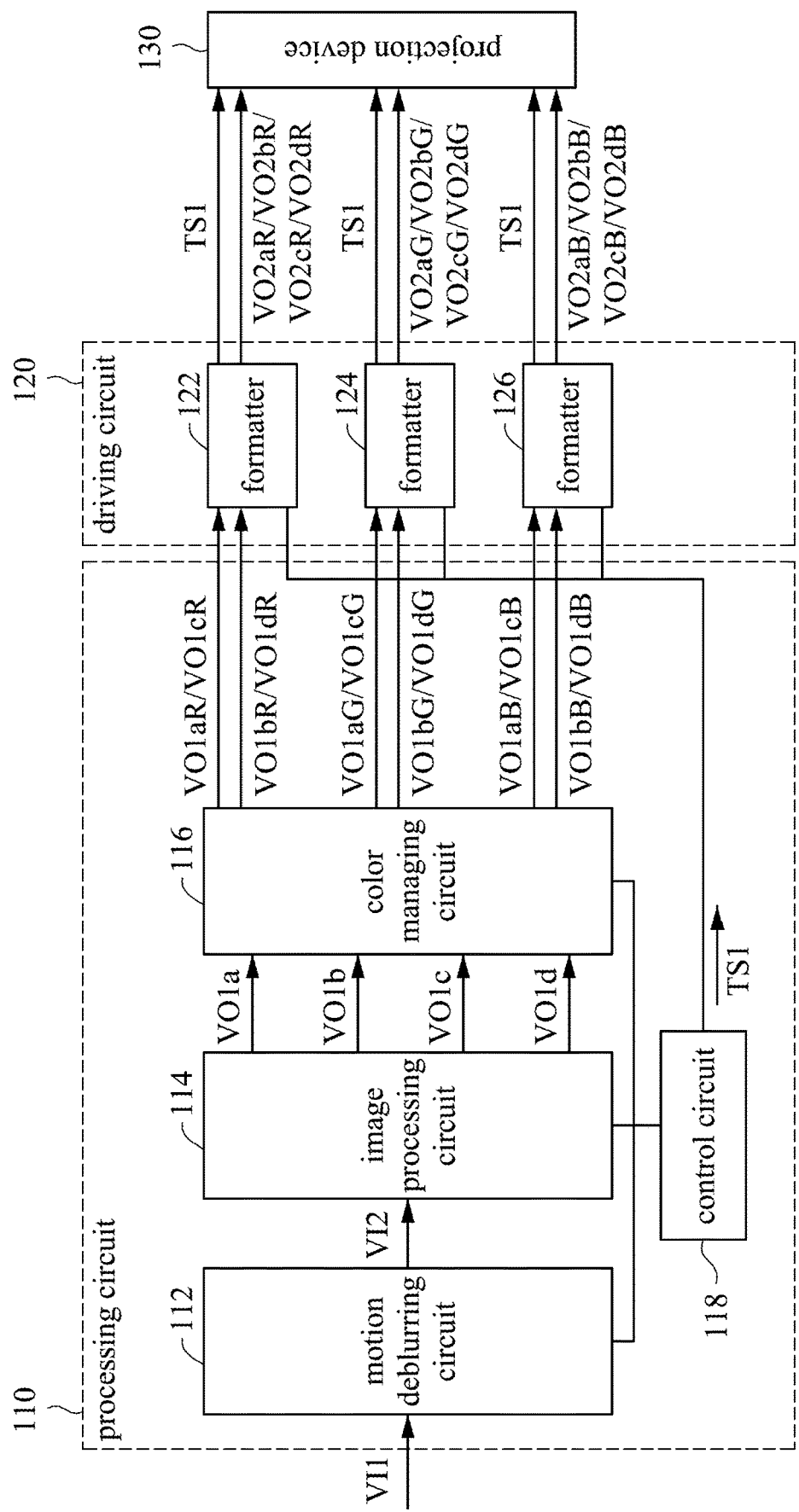
FIG. 2 is a partial circuit diagram of a projection display apparatus according to an embodiment of the present disclosure.

Referring to FIG. 2, FIG. 2 is a partial circuit diagram of a projection display apparatus according to an embodiment of the present disclosure. In an embodiment of the present disclosure, after the processing circuit 110 receives the input video signal VI1, the motion deblurring circuit 112 will use motion estimation and motion compensation (MEMC) to process the input video signal VI1 to improve blurring phenomenon of the input video signal VI1 and enhance the quality of the input video signal VI1. The input video signal VI2 is a video signal processed by the motion deblurring circuit 112.

For example, when the resolution of the input video signal VI2 is greater than the native resolution of the projection device 130, the image processing circuit 114 will convert the input video signal VI2 with the first resolution into a plurality of output video signals, each of the plurality of output video signals has a second resolution. For example, the input video signal VI2 may has the first resolution (such as 8K). In this case, the input video signal VI2 will be converted into four output video signals, and the second resolution of each output video signal may be 4K. In this embodiment, the image processing circuit 114 converts the input video signal VI2 into four output video signals and each of them has 4K resolution.

Figure 3:
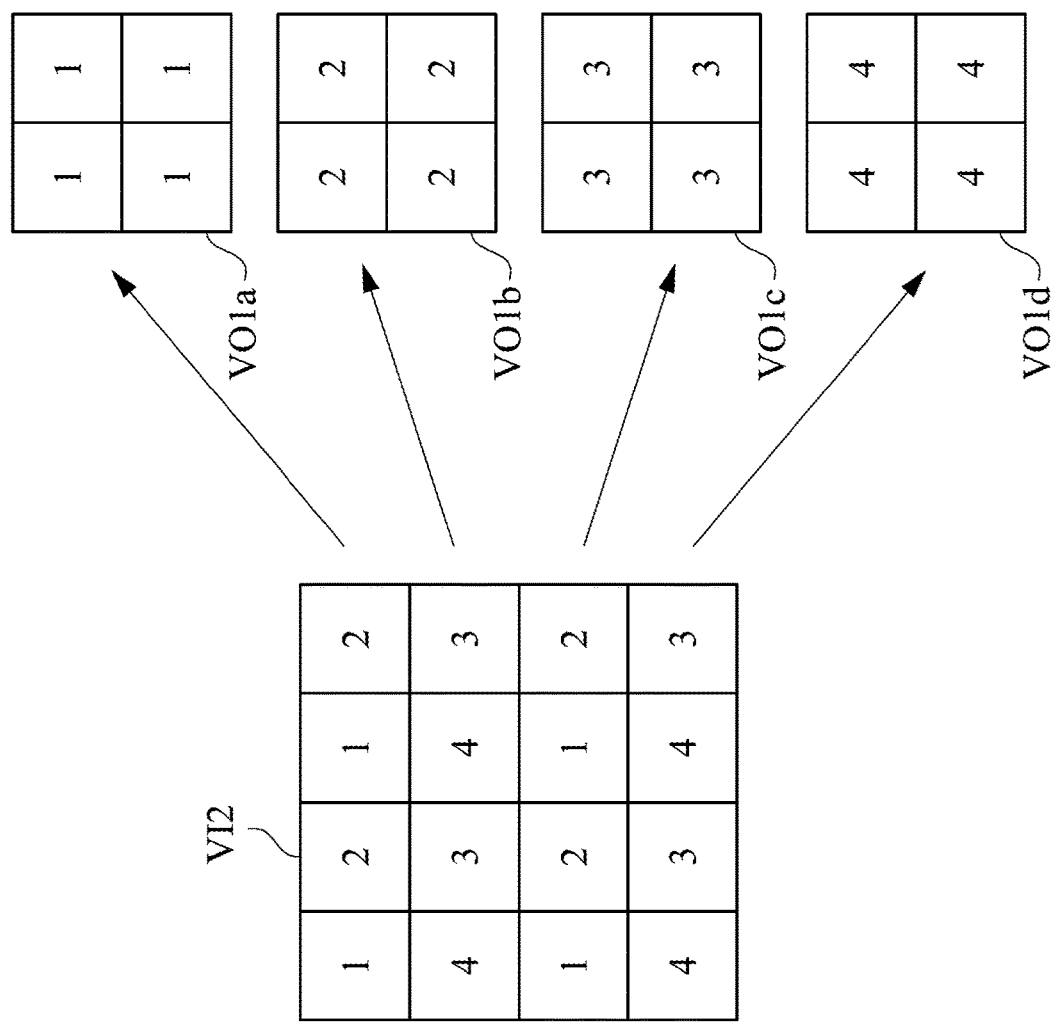
FIG. 3 is a schematic diagram of an image converting method according to an embodiment of the present disclosure.

Referring to FIG. 2 and FIG. 3, FIG. 3 is a schematic diagram of an image converting method according to an embodiment of the present disclosure. As shown in FIG. 3, in an embodiment, the image processing circuit 114 converts the input video signal VI2 with 8K resolution into four output video signals VO1a, VO1b, VO1c and VO1d. Each of the output video signals VO1a, VO1b, VO1c, and VO1d extracts ¼ of the pixels from the input video signal VI2 with 8K resolution to form a set of the output video signals with 4K resolution.

The conversation method is shown in FIG. 3, taking 4×4 pixel points as an example. The 16 pixel points of the input video signal VI2 are equally divided into four pixel regions, for example, an upper left region, an upper right region, a lower left region and a lower right region. The four pixel points of each region are further divided into four pixel blocks, for example, an upper left block, an upper right block, a lower left block, and a lower right block, and the pixels of the same pixel block in the four pixel regions are combined into an new output video signal. In this embodiment, for the convenience of description, the pixel points of the same pixel block are marked with the same number. The four pixel points of the output video signal VO1a are composed of the upper left pixel block (number 1) in the four regions of the original input video signal VI2. The output video signal VO1b is composed of the upper right pixel block (number 2), the output video signal VO1c is composed of the lower right pixel block (number 3), and the output video signal VO1d is composed of the lower left pixel block (number 4).

In FIG. 1, after the image processing circuit 114 converts the input video signal VI2 into four output video signals VO1, VO1b, VO1c and VO1d, the image processing circuit 114 will output them to the color managing circuit 116. Referring to FIG. 2, after the color managing circuit 116 in FIG. 2 receives four output video signals VO1, VO1b, VO1c and VO1d, the color managing circuit 116 will separate them by their color components.

In an embodiment, the color managing circuit 116 uses RGB color separation as an example. Because an 8-bit color image is composed of red, green, and blue (R, G, B) images with 0 to 255 color gradations. The closer to 0 color gradation, the darker the color will be (closer to black), the closer to 255 color gradation, the brighter the color will be (closer to white). Therefore, it is necessary to separately process the red, green and blue components in the image. The color management circuit 116 separates the red component of the output video signal VO1a into a red component output video signal VO1aR, the green component into a green component output video signal VO1aG, and the blue component into a blue component output video signal VO1aB. Similarly, the output video signals VO1b, VO1c, and VO1d are separated by the red component and generated the red component output video signals VO1bR, VO1cR, and VO1dR. The output video signals VO1b, VO1c, and VO1d are separated by the green component and generated the green component output video signals VO1bG, VO1cG, and VO1dG. The output video signals VO1b, VO1c, and VO1d are separated by the blue component and generated the blue component output video signals VO1bB, VO1cB, and VO1dB.

In the above embodiment, the color managing circuit 116 uses RGB color separation, but the disclosure is not limited thereto. In other embodiments, the color managing circuit 116 may also adopt different color separation processing methods, such as four-color separation, red-color blue-white (RGBW) color separation, luminance chromaticity (YCbCr) color separation, or other methods. The person skilled in the art can understand how to replace the above color separation method, and different color separation methods are within the scope of the present disclosure.

The control circuit 118 is configured to output the first timing signal TS1 and the second timing signal TS2 to control the operation time of the driving circuit 120 and the multi-axis shifting device 140.

If the resolution of the video signal is greater, the amount of data of the video signal is larger. In an embodiment, the output video signal processed by the color managing circuit 116 is transmitted by a Serializer/Deserializer (SerDes). The SerDes is a device capable of compressing a single-ended bus of a large bit width into one or more differential signals, converting parallel signals into high-speed sequence signals, and realizing a large amount of data transmission.

In FIG. 2, the driving circuit 120 includes a formatter 122, a formatter 124 and a formatter 126. The color managing circuit 116 outputs the color separated video signal to the formatter 122, the formatter 124 and the formatter 126. Under a cycle of the timing signal TS1, the color managing circuit 116 simultaneously outputs the red component output video signals VO1aR and VO1bR, the green component output video signals VO1aG and VO1bG, the blue component output video signals VO1aB and VO1bB to the formatter 122, the formatter 124 and the formatter 126. Under the next cycle of the timing signal TS1, the color managing circuit 116 simultaneously outputs the red component output video signals VO1cR and VO1dR, the green component output video signals VO1cG and VO1dG, the blue component output video signals VO1cB and VO1dB to the formatter 122, the formatter 124 and the formatter 126.

Namely, the formatter 122 processes the red component output video signals VO1aR, VO1bR, VO1cR and VO1dR, and generates the red component output video signals VO2aR, VO2bR, VO2cR and VO2dR in an image format required for the projection device 130. The formatter 124 processes the green component output video signals VO1aG, VO1bG, VO1cG and VO1dG, and generates the green component output video signals VO2aG, VO2bG, VO2cG and VO2dG in an image format required for the projection device 130. The formatter 126 processes the blue component output video signals VO1aB, VO1bB, VO1cB and VO1dB, and generates the blue component output video signals VO2aG, VO2bG, VO2cG and VO2dG in an image format required for the projection device 130.

In addition, the formatter 122, the formatter 124 and the formatter 126 transmit the timing signal TS1 generated by the control circuit 118 to the projection device 130. In step S240 and step S250 of FIG. 5, the projection device 130 receives the red component output video signals VO2aR, VO2bR, VO2cR and VO2dR, the green component output video signals VO2aG, VO2bG VO2cG and VO2dG, and the blue component output video signals VO2aB, VO2bB, VO2cB and VO2dB. The projection device 130 cooperates with the multi-axis shifting device 140.

In an embodiment, the digital micro display component 134 in the projection device 130 may include a matrix of a plurality of micro lenses and micro switches for adjusting the above micro lenses. The digital micro display component 134 projects a display screen by the light LS sent by the light source 132.

In an embodiment, the multi-axis shifting device 140 may include two set of voice coil motors and a lens, one of the voice coil motors is configured to drive the lens to rotate, such that the image projected by the digital micro display component 134 is shifted along the first axis, for example, the projected image is shifted up and down along the vertical axis on the screen. Other voice coil motor is configured to drive the lens to rotate, the image projected by the digital micro display component 134 is shifted along the second axis, for example, shifting the projected image to the left and right along the horizontal axis on the screen. However, the disclosure is not limited thereto. The operation of the two voice coil motor and the lens is not limited to move the projected image along the vertical and horizontal axes on the screen, or may be along two different axial. For example, the projected image is shifted along +45 degrees and −45 degrees. In another embodiment, the multi-axis shifting device 140 may also include a set of voice coil motor for driving the lens to rotate, causing the image projected by the digital micro display component 134 to shift along a single axis. In another embodiment, the multi-axis shifting device 140 may include a plurality of sets of voice coil motor that respectively rotate the lens to move the image projected by the digital micro display component 134 along different axial.

Figure 4:
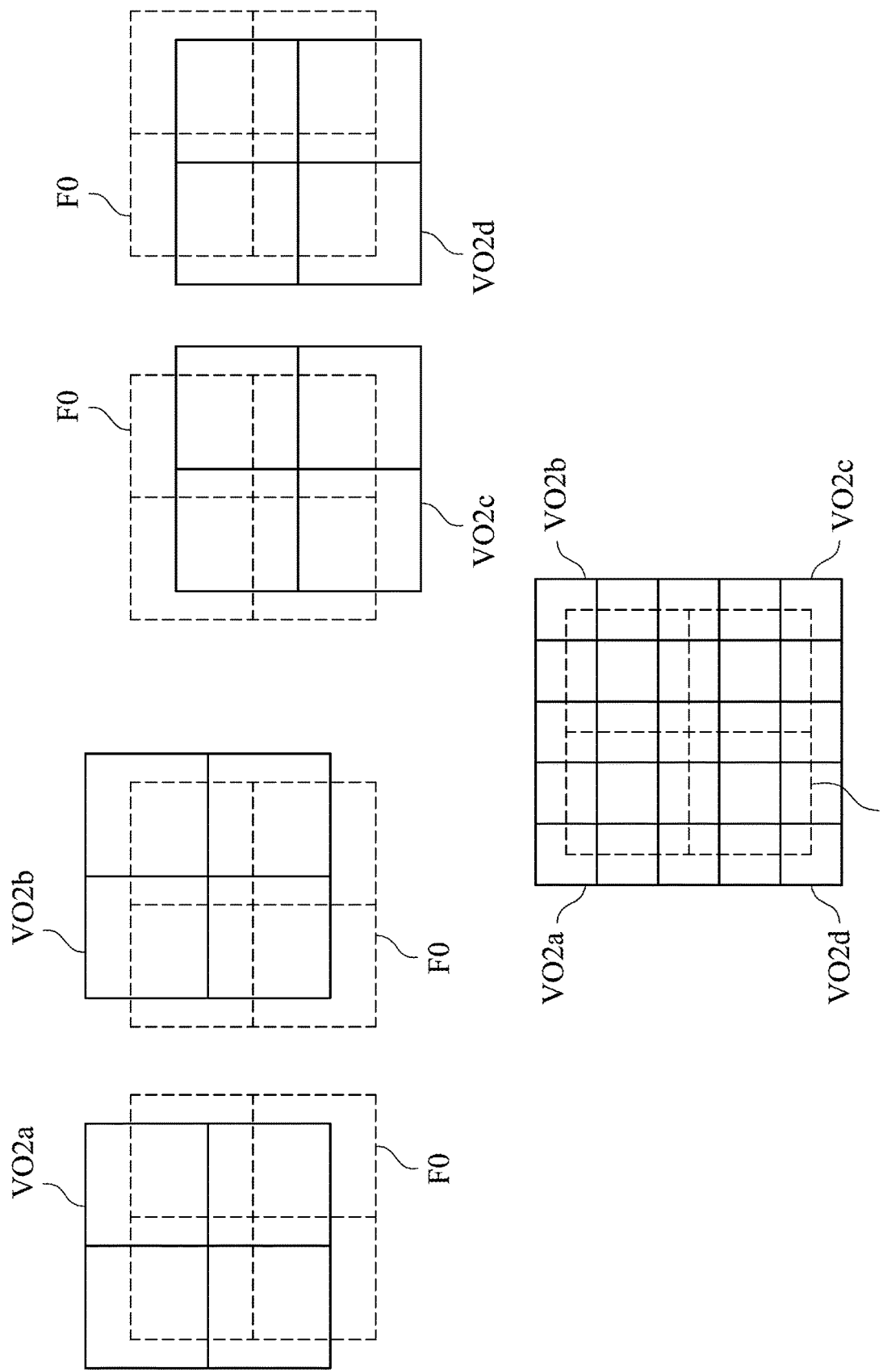
FIG. 4 is a schematic diagram of the image projected by a display apparatus is shifted at different time based on a control timing signal according to an embodiment of the present disclosure.
Figure 6:
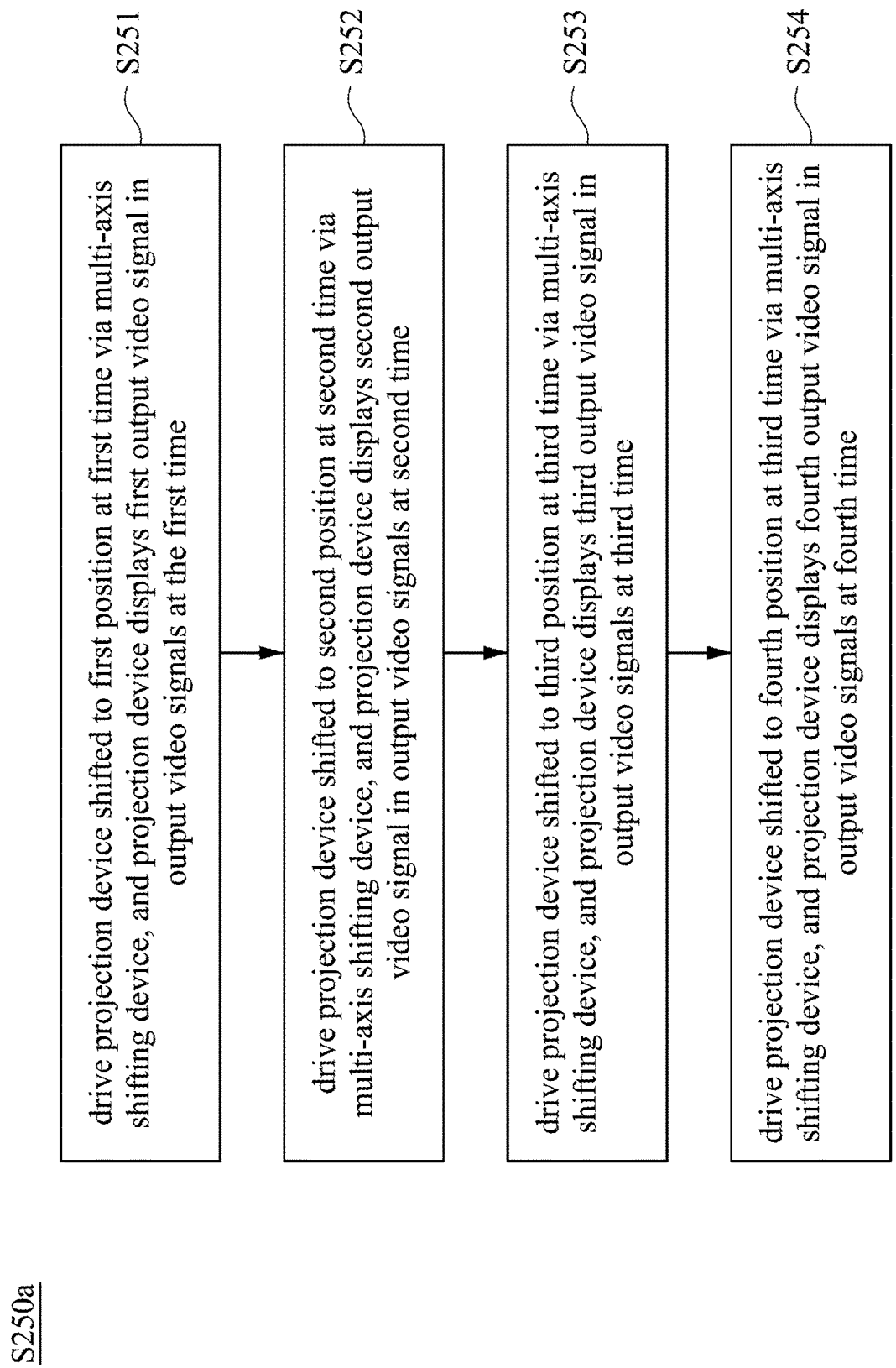
FIG. 6 is a flow chart of a display method for an image is shifted at different time based on a control timing signal according to an embodiment of the present disclosure.

Referring to FIG. 4 and FIG. 6, FIG. 4 is a schematic diagram of the image projected by a display apparatus is shifted at different time based on a control timing signal according to an embodiment of the present disclosure. FIG. 6 is a flow chart of a display method for an image is shifted at different time based on a control timing signal according to an embodiment of the present disclosure. The control circuit 118 respectively transmits the first timing signal TS1 and the second timing signal TS2 to the driving circuit 120 and the multi-axis shifting device 140. The driving circuit 120 then transmits the first timing signal TS1 to the digital micro display component 134 in the projection device 130. In this way, the multi-axis shifting device 140 and the digital micro display component 134 may simultaneously switch the image according to the synchronized first clock signal TS1 and the second clock signal TS2. The image position F0 represents the original image position projected by the digital micro display component 134 through the lens 150 when the multi-axis shifting device 140 is not actuated (i.e., it does not cause the projection screen to be shifted).

As shown in FIG. 4, the output video signal VO2a at the first time is component of the red component output video signal VO2aR, the green component output video signal VO2aG and the blue component output video signal VO2aB. The output video signal VO2b at the second time is component of the red component output video signal VO2bR, the green component output video signal VO2bG and the blue component output video signal VO2bB. The output video signal VO2c at the third time is component of the red component output video signal VO2cR, the green component output video signal VO2cG and the blue component output video signal VO2cB. The output video signal VO2d at the fourth time is component of the red component output video signal VO2dR, the green component output video signal VO2dG and the blue component output video signal VO2dB.

In step S251 of FIG. 6, at the first time, the control circuit 118 controls the multi-axis shifting device 140 to be biaxiality shifted to an upper left position. In this embodiment, the control circuit 118 transmits the second timing signal TS2 to the multi-axis shifting device 140 and then drives the multi-axis shifting device 140 to perform the above shift. For example, the embodiment in FIG. 4, the multi-axis shifting device 140 includes two biaxial motors, one of the motors drives the digital micro display component 134 to be shifted left by ¼ pixel width, and the other motor simultaneously drives the digital micro display component 134 to be shifted upward by ¼ pixel width. At the same time, the digital micro display component 134 images the output video signal VO2a composed of the red component output video signal VO2aR, the green component output video signal VO2aG, and the blue component output video signal VO2aB. The light LS projected by the light source 132 passes through the digital micro display component 134 to output the video signal VO2a at the first time, as shown in FIG. 4. In this embodiment, the first timing signal TS1 and the second timing signal TS2 are synchronized with each other to ensure that the driving operation of the multi-axis shifting device 140 and the imaging operation of the digital micro display component 134 are performed at the same time.

At the second time, in step S252, the control circuit 118 transmits the second timing signal TS2 to the multi-axis shifting device 140, thereby controlling the multi-axis shifting device 140 to be biaxially shifted to an upper right position. At the same time, the digital micro display component 134 images the output video signal VO2b. The light LS projected by the light source 132 passes through the digital micro display component 134 to output the video signal VO2b at the second time, as shown in FIG. 4.

At the third time, in step S253, the control circuit 118 transmits the second timing signal TS2 to the multi-axis shifting device 140, thereby controlling the multi-axis shifting device 140 to be biaxially shifted to a lower right position. At the same time, the digital micro display component 134 images the output video signal VO2c. The light LS projected by the light source 132 passes through the digital micro display component 134 to output the video signal VO2c at the third time, as shown in FIG. 4.

At the fourth time, in step S254, the control circuit 118 transmits the second timing signal TS2 to the multi-axis shifting device 140, thereby controlling the multi-axis shifting device 140 to be biaxially shifted to a lower left position. At the same time, the digital micro display component 134 images the output video signal VO2d. The light LS projected by the light source 132 passes through the digital micro display component 134 to output the video signal VO2d at the fourth time, as shown in FIG. 4.

The first time to the fourth time is a cyclic operation. After the output video signal VO2d to be projected, the control circuit 118 controls the multi-axis shifting device 140 to be biaxially shifted to the upper left position, and performs the first time operation again.

The output video signal VO2a, the output video signal VO2b, the output video signal VO2c and the output video signal VO2d partially overlap each other as shown in FIG. 4. In addition, in a cycle from the first time to the fourth time, the image overlapped by the four 4K resolution images of the output video signal VO2a-VO2d is equivalent to the image with 8K resolution, which is used to support the input image with 8K resolution.

Figure 5:
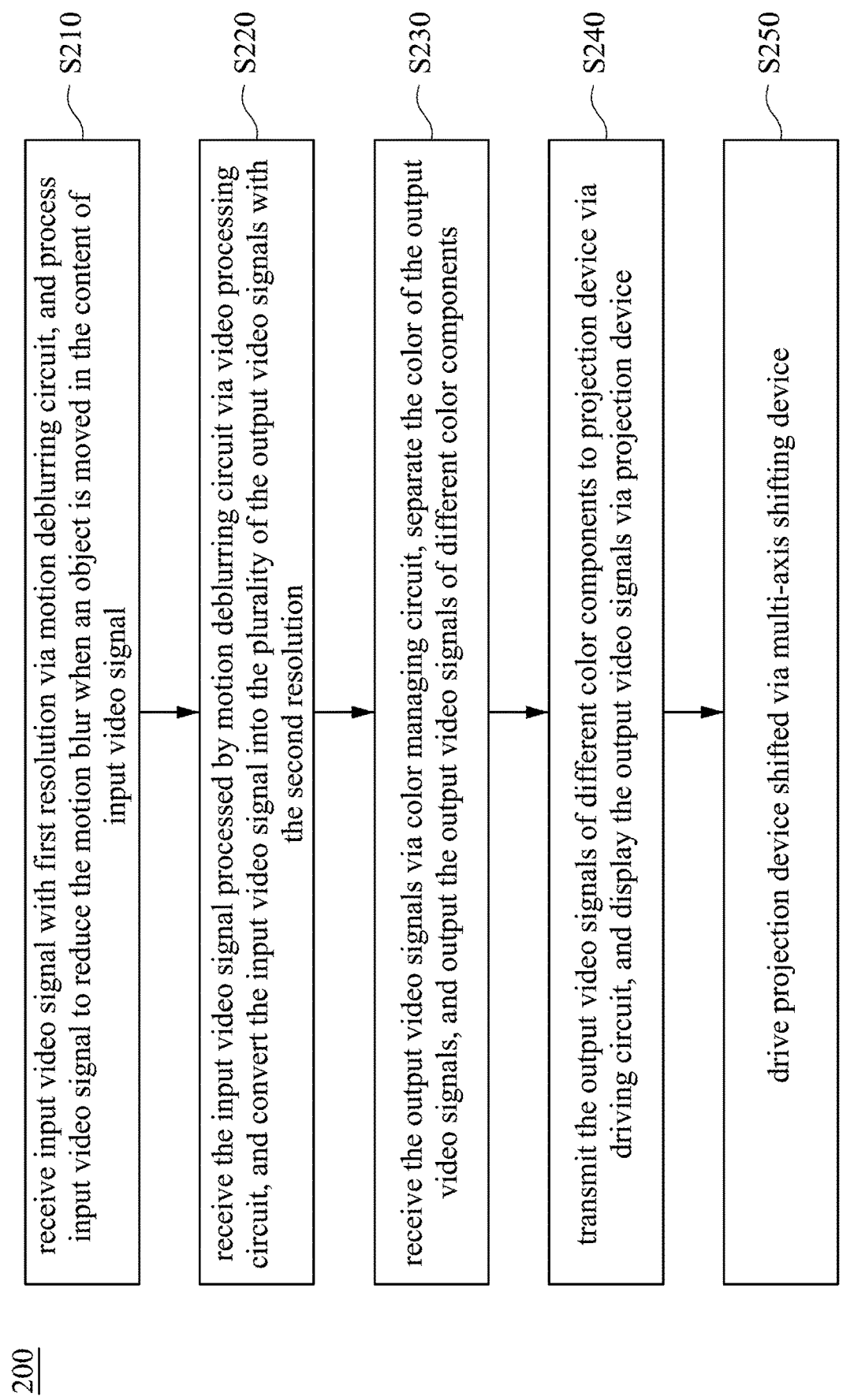
FIG. 5 is a flow chart of a display method according to an embodiment of the present disclosure.

Referring to FIG. 5, FIG. 5 is a flow chart of a display method according to an embodiment of the present disclosure. FIG. 5 includes step S210, step S220, step S230, step S240 and step S250. In step S210, the motion deblurring circuit 112 in the processing circuit 110 receives the input video signal VI1 with the first resolution, the processing reduces the dynamic blur when an object is moved in the content of the input video signal VI1, and outputs the processed input video signal VI2. In step S220, the image processing circuit 114 receives the input video signal processed by the motion deblurring circuit 112, and converts the input video signal VI2 into the plurality of the output video signals VO1a-VO1d with the second resolution. In step S230, the color managing circuit 116 receives the output video signals VO1a-VO1d, separates the color components of the output video signals VO1a-VO1d and outputs them. In step S240, the driving circuit 120 receives the different color components of the output video signals (VO1aR, VO1dR, VO1aG-VO1dG, VO1aB, and VO1dB) and transmits them to the projection device 130. In step S250, the multi-axis shifting device 140 drives the lens to the image projected by the projection device 130 to be shifted. The detailed operation mode is as described in FIG. 6 above, and details are not described herein again.

Through the operation of the above embodiment, the projection display device realizes an image whose output resolution is higher than the native resolution of the projection device by the cooperation between the digital micro display component and the shifting device.

Reference will now be made in detail to the present embodiments of the disclosure, examples of which are illustrated in the accompanying drawings. It will be apparent to those skilled in the art that after understanding the embodiments of the present disclosure, various modifications and variations can be made based on the teaching of the disclosure without departing from the scope or spirit of the disclosure.

What is claimed is:

1. A projection display apparatus, comprising:
   a motion deblurring circuit, configured to receive an input video signal with a first resolution, and process the input video signal to reduce a motion blur generated by an object moving in a content of the input video signal;
   an image processing circuit, configured to receive the input video signal processed by the motion deblurring circuit, and convert the input video signal processed by the motion deblurring circuit into a plurality of output video signals with second resolutions;
   a color managing circuit, configured to receive the plurality of output video signals with the second resolutions, and separate the colors of the plurality of output video signals, and output the plurality of output video signals with different color components;
   a projection device, including a digital micro display component, wherein the digital micro display component has a native resolution, the native resolution is the second resolution, and the projection device is configured to project and display the plurality of output video signals; and
   a multi-axis shifting device, located in front of a projection lens, and configured to periodically shift the plurality of output video signals outputted from the projection device onto a projection screen according to a control timing signal.

2. The projection display apparatus of claim 1, further comprising:
   a plurality of formatters, coupled between the color managing circuit and the projection device, wherein the color managing circuit transmits the plurality of output video signals with different color components to the formatters by a plurality of buses.

3. The projection display apparatus of claim 2, wherein the plurality of buses are a Serializer/Deserializer (SerDes).

4. The projection display apparatus of claim 1, wherein the multi-axis shifting device drives the projection device to be shifted to a first position at a first time, and the projection device displays a first output video signal in the plurality of output video signals at the first time;
   the multi-axis shifting device drives the projection device to be shifted to a second position at a second time, and the projection device displays a second output video signal in the plurality of output video signals at the second time;
   the multi-axis shifting device drives the projection device to be shifted to a third position at a third time, and the projection device displays a third output video signal in the plurality of output video signals at the third time; and
   the multi-axis shifting device drives the projection device to be shifted to a fourth position at a fourth time, and the projection device displays a fourth output video signal in the plurality of output video signals at the fourth time.

5. The projection display apparatus of claim 4, wherein the first position is shifted to the left by a quarter of a pixel relative to an unshifted position of the plurality of output video signals and shifted upward by a quarter of the pixel relative to the unshifted position of the plurality of output video signals;

the second position is shifted to the right by a quarter of a pixel relative to the unshifted position of the plurality of output video signals and shifted upward by a quarter of the pixel relative to the unshifted position of the plurality of output video signals;

the third position is shifted to the right by a quarter of a pixel relative to the unshifted position of the plurality of output video signals and shifted downward by a quarter of the pixel relative to the unshifted position the plurality of output video signals; and the fourth position is shifted to the left by a quarter of a pixel relative to the unshifted position the plurality of output video signals and shifted downward by a quarter of the pixel relative to the unshifted position the plurality of output video signals.

6. The projection display apparatus of claim 4, wherein projection positions of the first output video signal, the second output video signal, the third output video signal, and the fourth output video signal, which are displayed by the projection device, partially overlap with each other.

7. A display method, comprising:
receiving an input video signal with a first resolution via a motion deblurring circuit, and processing the input video signal to reduce a motion blur generated by an object moving in a content of the input video signal;
receiving the input video signal processed by the motion deblurring circuit via a video processing circuit, and converting the input video signal into a plurality of output video signals with a second resolution;
receiving the plurality of output video signals via a color managing circuit, separating colors of the plurality of output video signals, and outputting the plurality of output video signals of different color components by a plurality of buses;
transmitting the output video signals with different color components to a projection device via a plurality of formatters in a driving circuit;
displaying the plurality of output video signals via the projection device; and
driving the projection device to be shifted via a multi-axis shifting device.

8. The display method of claim 7, wherein the plurality of buses are a Serializer/Deserializer (SerDes).

9. The display method of claim 7, further comprising:
driving the projection device to be shifted to a first position at a first time via the multi-axis shifting device, and the projection device displays a first output video signal in the plurality of output video signals at the first time;
driving the projection device to be shifted to a second position at a second time via the multi-axis shifting device, and the projection device displays a second output video signal in the plurality of output video signals at the second time;
driving the projection device to be shifted to a third position at a third time via the multi-axis shifting device, and the projection device displays a third output video signal in the plurality of output video signals at the third time; and
driving the projection device to be shifted to a fourth position at a fourth time via the multi-axis shifting device, and the projection device displays a fourth output video signal in the plurality of output video signals at the fourth time.

10. The display method of claim 9, further comprising:
the projection device being shifted to the left by a quarter of a pixel and upward by a quarter of a pixel via the projection device;
the projection device being shifted to the right by a quarter of a pixel and upward by a quarter of a pixel via the projection device;
the projection device being shifted to the right by a quarter of a pixel and downward by a quarter of a pixel via the projection device; and
the projection device being shifted to the left by a quarter of a pixel and downward by a quarter of a pixel via the projection device.

11. The display method of claim 10, wherein the projection positions of the first output video signal, the second output video signal, the third output video signal and the fourth output video signal, which are displayed by the projection device, partially overlap with each other.

* * * * *